Aug. 1, 1950 — R. E. JONES — 2,517,112
WORK SUPPORT FOR MACHINE TOOLS
Filed Feb. 18, 1946
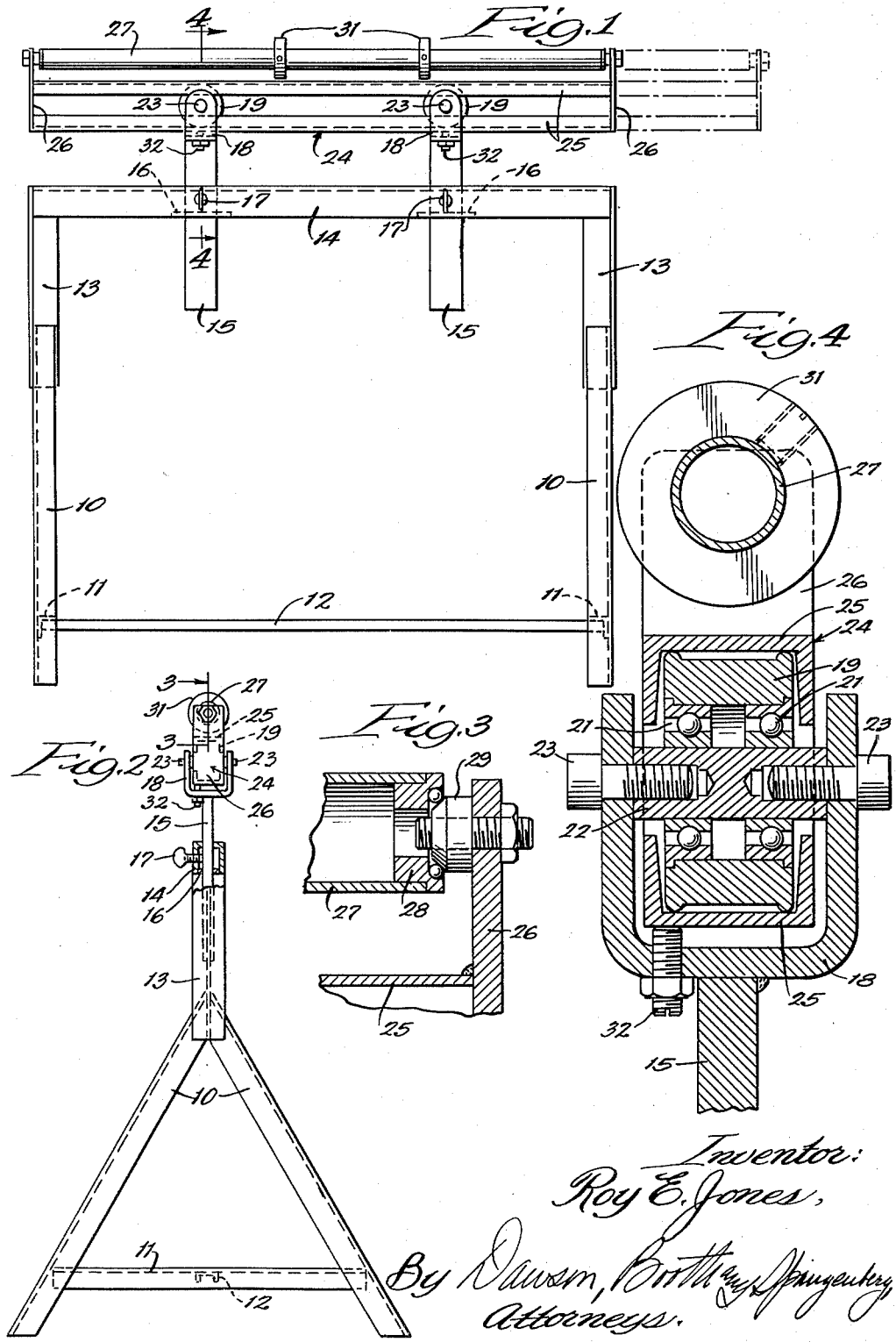
Inventor:
Roy E. Jones,
By Dawson, Brothers & Springenberg
Attorneys.

Patented Aug. 1, 1950

2,517,112

UNITED STATES PATENT OFFICE 2,517,112

WORK SUPPORT FOR MACHINE TOOLS

Roy E. Jones, South Bend, Ind.

Application February 18, 1946, Serial No. 648,421

2 Claims. (Cl. 143—132)

This invention relates to supports and more particularly to supports for holding work pieces during machining or like operations thereon.

In many types of machining operations such, for example, as sawing, planing or drilling, it is frequently necessary to work on a piece which extends beyond the supporting surface or table of the machine. For proper handling of such pieces, it is necessary that supporting means be provided to hold the free or projecting ends of the pieces during the machining operation, and it is desirable that such supporting means should enable the work piece to be moved freely. It is one of the objects of the present invention to provide a support which is simple and inexpensive to manufacture and which will support a work piece for free movement relative to a machine.

Another object is to provide a support including a roller on which the work piece is supported and which is mounted for free movement lengthwise of its axis.

Another object is to provide a support in which the roller is rotatably mounted on a carriage movable lengthwise of the roller axis and which is held against tilting in all positions of its movement.

Still another object is to provide a support in which movement of the work piece may be confined to one direction.

The above and other objects and advantages will be more readily apparent from the following description when read in connection with the accompanying drawing, in which—

Figure 1 is an elevation of a support embodying the invention;

Figure 2 is an end view with parts in section;

Figure 3 is an enlarged partial section on the line 3—3 of Figure 2 showing the roller mounting; and Figure 4 is a section on the line 4—4 of Figure 1.

The support comprises a base which may be conveniently fabricated of standard metal shapes. As shown, the base comprises pairs of legs 10 connected together at an angle at their upper ends with cross braces 11 connecting their lower ends. A longitudinal brace 12 connects the cross braces 11 to prevent spreading of the pairs of legs. At their upper ends the legs of each pair fit against the center flange of a T section beam 13 and may be welded thereto. The tops of the T section beams 13 are connected by an inverted channel beam 14 to form a completed base which is light in weight, inexpensive to manufacture and which possesses a very substantial strength.

A pair of vertical posts 15 are slidably mounted in the channel beam 14 for vertical adjustment therein. As shown in Figure 2, the posts 15 extend through openings in the web of the channel beam 14 and are held against tilting by plates 16 welded across the open flanges of the channel beam 14. The posts 15 may be held in vertically adjusted positions by wing screws 17 threaded into the side of the channel beam to engage the posts.

At their upper ends the posts carry yokes 18 which rotatably support rollers 19. As shown the rollers are mounted on ball bearings 21 supported on arbors 22 held in place in the yokes by screws 23.

The rollers 19 are adapted to support a carriage indicated generally at 24 for lengthwise movement on the base. As shown the carriage is formed by a pair of elongated channels 25 which fit respectively above and below the rollers 19 and which are connected at their ends by end plates 26. With this construction the carriage can slide lengthwise on the base and due to engagement of the channels with the rollers will be held against tilting in any position of adjustment. The end plates 26 carry an elongated roller 27 on which a work piece is adapted to rest. As best seen in Figure 3, the roller 27 is formed by a tube carrying bearing blocks 28 at its ends which are rotatably supported on cones 29 which are attached to the end plates 26.

With the construction as so far described the elevation of the roller and its angle to the horizontal may be adjusted as desired by raising and lowering the posts 15. When the roller is at the proper height, it may support a work piece which can be moved freely across the roller due to rotation thereof on its bearings. At the same time the work piece can be moved freely in a direction at right angles due to free sliding of the carriage on the rollers 19. In this way complete freedom of movement of the work piece is obtained so that it can be moved to and through a desired tool easily.

In some instances it may be desirable to limit movement of the work piece on the roller as, for example, when sawing or planing elongated planks. For this purpose stop collars 31 may be adjustably mounted on the roller 27 to confine the work piece between them. To prevent movement of the carriage on the base set screws 32 may be provided in the yokes 18 to engage the carriage and hold it against movement on the rollers. When the collars 31 are properly adjusted and tightened on the roller 27 and the set screws 32 are tightened against the carriage, movement of the work piece longitudinally of the roller will be prevented, and the carriage will be locked against movement on the base so that the support serves as a guide for the work piece.

While one embodiment of the invention has been shown and described in detail herein, it will be understood that this is illustrative only and is not intended as a definition of the scope of the invention, reference being had for this purpose to the appended claims.

What is claimed is:

1. A support comprising a base, a pair of horizontally spaced vertical posts slidably carried by the base for vertical adjustment, means to hold the posts in adjusted position on the base, rollers carried by the upper ends of the posts, a carriage having vertically spaced elongated tracks between which the rollers fit whereby the carriage can move lengthwise on the base, and an elongated roller rotatably mounted on the carriage with its axis parallel to the tracks.

2. A support comprising a base, a pair of horizontally spaced vertical posts carried by the base and terminating at their upper ends in yokes, rollers mounted in the yokes on horizontal axes, a carriage having vertically spaced elongated channels fitting over the tops and bottoms of the rollers respectively whereby the carriage can move lengthwise on the rollers, end plates connecting the ends of the channels and projecting above the upper channel, and an elongated roller rotatably supported at its ends on the projecting portions of the end plates.

ROY E. JONES.

REFERENCES CITED

The following references are of record in the file of this patent:

UNITED STATES PATENTS

| Number | Name | Date |
|---|---|---|
| 729,374 | Marsh | May 26, 1903 |
| 764,491 | Newlove | July 5, 1904 |
| 777,584 | Bartlow | Dec. 13, 1904 |
| 954,933 | Cossey | Apr. 12, 1910 |
| 1,044,816 | Phillipson | Nov. 19, 1912 |
| 1,045,523 | Cossey | Nov. 26, 1912 |
| 1,189,603 | Michener | July 4, 1916 |
| 1,636,924 | Porter | July 26, 1927 |
| 1,658,826 | Yerk et al. | Feb. 14, 1928 |
| 1,813,783 | Tomlinson et al. | July 7, 1931 |
| 1,825,862 | Green | Oct. 6, 1931 |